W. VOLLMANN.
FILM WINDING DEVICE.
APPLICATION FILED APR. 12, 1922.

1,417,474.

Patented May 23, 1922.

Inventor
Walter Vollmann
By his Attorney

UNITED STATES PATENT OFFICE.

WALTER VOLLMANN, OF BERLIN, GERMANY.

FILM-WINDING DEVICE.

1,417,474.  Specification of Letters Patent.  Patented May 23, 1922.

Application filed April 12, 1922. Serial No. 552,033.

*To all whom it may concern:*

Be it known that I, WALTER VOLLMANN, a citizen of the Republic of Germany, and a resident of Berlin, Germany, have invented certain new and useful Improvements in Film-Winding Devices, of which the following is a specification.

The invention relates to film winding devices and an object of the invention is the provision of devices whereby the necessity of using a reel from which the film is unwound and a reel on which the film is wound at the other end, is avoided. Other objects and advantages of the invention will appear more fully in the following specification and be particularly pointed out in the appended claims.

For winding up and unwinding endless cinematograph films, as used for example in advertising displays, it has previously been suggested that an annular series of rollers be used, upon which the film is directly wound or upon which is wound a special carrier band to which the innermost winding of the film is firmly attached. All of such previous devices, however, are open to the objection that the film winds up tighter and tighter because the diameter of the wound film spool or roll becomes increasingly greater, because of which the strain on the film constantly increases with the result that the film is liable to break.

This defect is remedied by the present invention by the provision of devices about which the film is wound or which are situated inside a roll of the film, which devices move back and forth and press at different points against the inner winding of the roll of film. Preferably rollers are provided about which the film is wound, these rollers being journalled in a movable frame which constantly moves back and forth during the winding and unwinding of the film, so that the wound spool or roll of film is constantly forced by these rollers in one direction or the other to a certain extent, so that the spool of film is thereby constantly held uniformly loose.

One embodiment of the invention is illustrated in the drawings in which Fig. 1 represents a side elevation of one embodiment of the device applied to a cinematograph shown in dotted lines;

Figure 1:
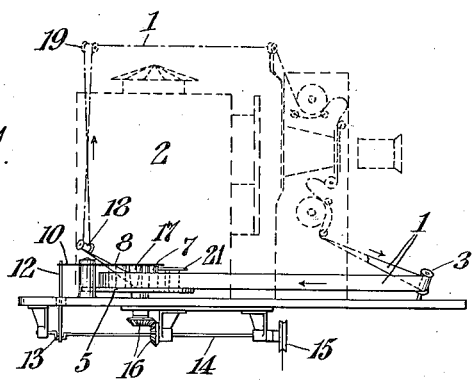
Figure 2:
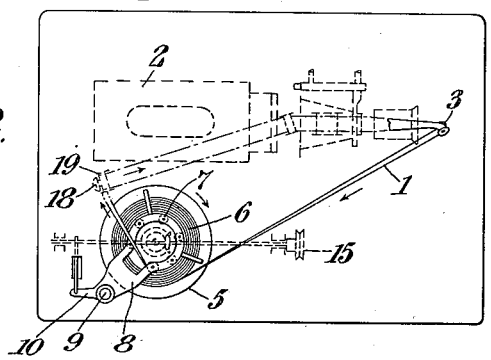
Fig. 2 is a plan view of the same.

Referring to the drawings, the film 1 follows the course indicated in full lines and partly in dotted lines in Figs. 1 and 2 of the drawings, the film being drawn past the lens of the cinematograph in the usual manner. The film passes around a roller 3 which is set at an inclination. By this means the film is brought into proper position to be wound on to a horizontal disc 5 which is rotatable about a vertical shaft 4.

The film is wound upon itself on the disc 5 to form the roll or spool of film 6, the film winding on to the outside of this roll 6 and unwinding from the interior of the roll 6 as will subsequently be described.

Figure 3:
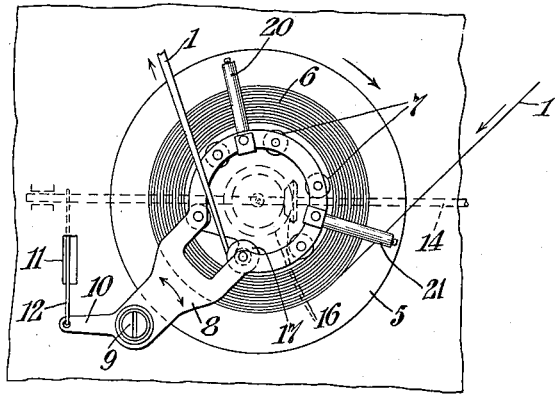
Fig. 3 is a partial plan view of the same on an enlarged scale.
Figure 4:
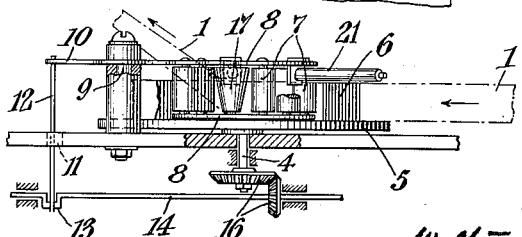
Fig. 4 is a side elevation partly in section.

In the interior of the roll of film 6 is positioned an annular series of vertically mounted rollers 7 which are journalled in a frame 8. This frame comprises or has secured thereto an arm which is pivotally mounted on a vertical pin 9. An arm 10 is carried by, or is integral with the arm referred to, and this arm 10 has connected thereto one end of a rod 12 which extends obliquely downwards through an opening 11 in the table on which the apparatus is mounted. The lower end of rod 12 is connected to a crank 13 on a shaft 14 which may be suitably journalled underneath the table, shaft 14 being rotated from the driving device or source of power of the cinematograph, as by means of a cord pulley 15 on shaft 14. The vertical spindle 4 of rotating disc 5 is also rotated from shaft 14, by means of the beveled gears 16, 16, mounted on shaft 14 and on spindle 4, or equivalent devices, so that disc 5 will constantly rotate in the direction indicated by the arrow in Fig. 3.

Film 1 will be wound on to the outside of the roll 6 during the rotation of disc 5. Frame 8 is constantly oscillated back and forth about pin 9 during the operation of the device, because of the connection thereof with crank 13, the oscillation of frame 8 back and forth being indicated by the double arrow on the arm pivotally mounted on pin 9, in Fig. 3 of the drawings. Because of this movement of frame 8 the rollers 7 will constantly engage against the innermost winding of the roll 6 of film, first on one side and then on the other. Roll 6 will be moved short distances back and forth over the rotating table 5 by this action and the interior of the roll will be somewhat deformed from its circular shape by this action, the inner portion of the roll being bulged outwardly somewhat by each roller 7 which engages therewith momentarily, the inner winding of the roll being thus pressed into a somewhat ovel shape. By this action the roll 6 is maintained uniformly loose and consequently its external diameter also remains constantly uniform. It should be understood that such a roll constantly tends to be wound tighter and tighter at its inner windings and an action such as that described serves to prevent such tightening.

The film unwinds from the inner winding of the roll as is stated above, the film passing around a conically shaped roller 17 and moving therefrom outwardly and upwardly at an angle to and around an obliquely positioned roller 18 from which it travels upwardly to and around a roller 19 about which it turns through an angle of 90°. The film then passes around another or other suitably positioned roller or rollers to place it in the proper position to be fed by the usual or well known means past the lens of the cinematograph.

Two horizontally positioned rollers 20, 21, are also journaled in the frame 8 to lie above roll 6. It will thus be noted that the lower edge of the film roll 6 rests on rotating disc 5 and is frictionally driven thereby while the upper edge of the roll is engaged by the rolls 20 and 21 which latter prevent roll 6 from being wound in a non-uniform manner, as might happen under certain conditions in consequence of the impacts of the rollers 7 on the innermost winding of the roll.

It should be understood that the invention is not limited strictly to the details of construction which have been particularly described but that the same is as broad as is indicated by the accompanying claims.

What I claim is:—

1. In moving picture apparatus, the combination of means for progressing an endless film through a closed path and for winding the same on itself in a roll at one point in the path, and means within said roll for momentarily pressing against the innermost winding thereof, at different points therein in succession, to prevent said roll from tightening unduly.

2. In moving picture apparatus, the combination of means for progressing an endless film through a closed path and for winding the same on itself in a roll at one point in the path, on which the film winds and from which it unwinds during its progression, and means for pressing said roll at different points thereof successively during such progression, to prevent said roll from tightening unduly.

3. In moving picture apparatus, the combination of means for continuously winding a film on itself in a roll and unwinding the same from the roll, and means for pushing the roll in different directions alternately, during such progression, to prevent said roll from tightening unduly.

4. In moving picture apparatus, the combination of a rotating support, a member above the same about which a film is constantly wound in a roll resting on said support and comprising a plurality of windings, the film being led off from the roll as it is wound thereon, and means for moving said member successively in one direction or another to press against different points on the inner winding of the roll.

5. In moving picture apparatus, the combination of a rotating support, a member above the same about which a film is constantly wound in a roll resting on said support and comprising a plurality of windings, the film being led off from the roll as it is wound thereon, and means comprising an oscillating arm for moving said member in opposite directions alternately to cause the same to press against opposite points on the inner winding of the roll and to accordingly move the roll over said support.

6. In moving picture apparatus, the combination of a support, a member above the same carrying rollers in circular series, about which a film is constantly wound in a roll from which the film is led off as it is wound thereon, means for progressing the film, and means for moving said member successively in one direction or another to press against different points on the inner winding of the roll.

In testimony whereof I hereunto affix my signature in presence of two witnesses.

WALTER VOLLMANN.

Witnesses:
LAURENCE R. HANSEM,
R. S. AUSPLEER.